3,031,477
Δ⁴-PREGENE-7α,17α,21-TRIOL-3,20-DIONE
AND ESTERS THEREOF
Richard W. Thoma, Somerville, and Josef Fried, Princeton, N.J., assignors to Olin Mathieson Chemical Corporation, New York, N.Y., a corporation of Virginia
No Drawing. Original application Feb. 24, 1956, Ser. No. 567,478, now Patent No. 2,960,513, dated Nov. 15, 1960. Divided and this application Apr. 5, 1960, Ser. No. 20,036
3 Claims. (Cl. 260—397.47)

This application is a division of Serial No. 567,478, filed February 24, 1956, now Patent No. 2,960,513.

This invention relates to, and has for its object, the provision of the following steroids: Δ⁴-pregnene-7α,17α,21-triol-3,20-dione (7α-hydroxy-Compound S) and its esters, particularly esters thereof with organic hydrocarbon carboxylic acids of less than ten carbon atoms, and to the preparation of Δ⁶-Compound S (i.e., Δ⁴,⁶-pregnadiene-17α,21-diol-3,20-dione).

Δ⁴-pregnene-7α,17α,21-triol-3,20-dione, useful as an intermediate in the preparation of other steroids, is prepared by subjecting Δ⁴-pregnene-17α,21-diol-3,20-dione (Compound S) to the action of enzymes of the microorganism *Diplodia natalensis* under oxidizing conditions. This oxidation can best be effected by either including the steroid in an aerobic culture of the microorganism, or by bringing together, in an aqueous medium, the steroid, air and enzymes of non-proliferating cells of the microorganism.

In general, the conditions of culturing *Diplodia natalensis* for the purposes of this invention are (except for the inclusion of the steroid to be converted) the same as those of culturing various other molds for the production of antibiotics and/or riboflavin, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period may vary considerably, the range of about 6 to 96 hours being feasible, but not limiting.

The process yields, inter alia, Δ⁴-pregnene-7α,17α,21-triol-3,20-dione, a steroid useful not only as an intermediate in the preparation of other steroids, but also in common with its mono and diester derivatives, as a mineralocorticoid (i.e., an agent causing the retention of sodium and excretion of potassium). Hence, Δ⁴-pregnene-7α,17α,21-triol-3,20-dione and esters thereof, particularly esters with organic hydrocarbon carboxylic acids of less than ten carbon atoms (e.g., the lower alkanoic acids as exemplified by acetic, propionic and enanthic acid, the aralkanoic acids as exemplified by α-toluic and β-phenylpropionic, and the aromatic acids as exemplified by benzoic and o-, m- or p-toluic acid) can be used in lieu of known salt-retaining steroids, and may be administered parenterally in the treatment of Addison's disease, being formulated for such administration in the same type of preparations as desoxycorticosterone acetate, for example, with concentration and/or dosage based on the activity of the particular steroid.

The esters of Δ⁴-pregnene-7α,17α,21-triol-3,20-dione are prepared in the usual manner, as by treatment with the desired acid anhydride or acyl halide in an organic solvent (preferably an organic base such as pyridine) to yield either the 21-mono ester or the 7α,21-diester depending on the ratio of acylating agent to steroid present in the reaction mixture. Δ⁴-pregnene-7α,17α,21-triol-3,20-dione can also, if desired, be dehydrated in the usual manner, as by treatment with a base (e.g., methanolic potassium hydroxide) to give Δ⁴,⁶-pregnadiene-17α,21-diol-3,20-dione, which can then, if desired, be esterified to the 21-ester. Δ⁴,⁶-pregnadiene-17α,21-diol-3,20-dione and its 21-esters are also useful as mineralocorticoids. Hence, they can be used in lieu of known salt-retaining steroids and may be administered parenterally in the treatment of Addison's disease.

The following examples are illustrative of the invention:

EXAMPLE 1

Δ⁴-Pregnene-7α,17α,21-Triol-3,20-Dione (a) *Fermentation.*—A fermentation medium of the following composition is prepared:

| | G. |
|---|---|
| Dextrose | 10 |
| Corn steep liquor | 6 |
| NH₄H₂PO₄ | 3 |
| CaCO₃ | 2.5 |
| Yeast extract | 2.5 |
| Soybean oil | 2.2 |

Distilled water to make one liter.

The pH of the medium is adjusted to 7.0±0.1 with 2 N NaOH solution, and 50 ml. portions of the medium are distributed in six 250 ml. flasks, the flasks plugged with cotton and sterilized by autoclaving for 30 minutes at 120° C. When cool, each of the flasks is inoculated with 1.0 ml. of a suspension prepared by using 7.0 ml. of water (with 0.01% Duponol as wetting agent) to suspend the sporulated growth of a 3 month old Sabouraud dextrose agar slant (4 parts dextrose, 1 part neopeptone and 1.5 parts agar to 100 parts water) culture of *Diplodia natalensis* ATCC No. 9055 or derived strains; the parent organism is obtainable, inter alia, from the American Type Culture Collection, Washington, D.C.

The flasks are then mechanically shaken for 69 hours at 25° C. on a 280 cycle per minute rotary shaker, after which about 9% (v./v.) is transferred to each of 51 flasks containing 50 ml. of the same medium. After 48 hours' incubation, a total of 638 mg. of Δ⁴-pregnene-17α,21-diol-3,20-dione in 25.5 ml. of methanol (to give 0.25 mg. of steroid per ml. in the fermentation vessel) is added. The flasks are then incubated an additional 24 hours, after which the flasks are harvested, and the contents filtered through a Seitz pad and washed with water give a final volume of filtrate and washings of 2480 ml.

(b) *Isolation of Δ⁴ - pregnene - 7α,17α,21 - triol - 3,20-dione.*—The culture filtrate (2480 ml.) is extracted with three 1500 ml. portions of chloroform and the combined extracts evaporated to dryness in vacuo. The crystalline residue (about 438 mg.) is washed with hexane and recrystallized from 95% alcohol. 125 mg. of Δ⁴-pregnene-7α,17α,21-triol-3,20-dione is obtained, which melts at about 245–247° C. and which after additional recrystallization, melts at about 248–250° C.; $[\alpha]_D^{24}$ +97° (c., 0.3 in 95% alcohol);

$\lambda_{max.}^{alc.}$ 241 m$\mu$ ($\epsilon$=16,000); $\lambda_{max.}^{Nujol}$ 2.90$\mu$, 3.00$\mu$ and 3.08$\mu$ (OH), 5.91$\mu$ (20-keto), 6.10$\mu$, 6.20$\mu$ ($\Delta^4$-3-keto)

*Analysis.*—Calcd. for $C_{21}H_{30}O_5$ (362.45): C, 69.58; H, 8.34. Found: C, 69.76; H, 8.41.

$\Delta^4$-pregnene-7$\alpha$,17$\alpha$,21-triol-3,20-dione can be esterified as illustrated by the following example:

EXAMPLE 2

*$\Delta^4$-Pregnene-7$\alpha$,17$\alpha$,21-Triol-3,20-Dione 7$\alpha$,21-Diacetate*

A solution of 20 mg. of $\Delta^4$-pregnene-7$\alpha$,17$\alpha$,21-triol-3,20-dione in 0.5 ml. of pyridine and 0.5 ml. of acetic anhydride is allowed to stand overnight at room temperature. Removal of the excess reagents in vacuo leaves a crystalline residue (about 26 mg.) which after two recrystallizations from acetone-hexane furnishes the pure $\Delta^4$-pregnene-7$\alpha$,17$\alpha$,21-triol-3,20-dione diacetate having the following properties: M.P. about 180–182° C; $[\alpha]_D^{23}$ +39° (c., 0.40 in CHCl$_3$);

$\lambda_{max.}^{alc.}$ 238 m$\mu$ ($\epsilon$=15,500); $\lambda_{max.}^{Nujol}$ 2.88$\mu$ (OH); 5.75$\mu$, 5.79$\mu$ (acetyl and 20-keto), 6.00$\mu$, 6.18$\mu$ ($\Delta^4$-3-keto)

*Analysis.*—Calcd. for $C_{25}H_{34}O_7$ (446.52): C, 67.24; H, 7.68. Found: C, 67.63; H, 7.70.

Similarly by substituting other acid anhydrides, such as propionic anhydride, or acyl halides, such as benzoyl chloride, for the acetic anhydride in the procedure of Example 2, the corresponding ester derivatives are produced. Furthermore, if only one mole equivalent of acetic anhydride is used in the procedure of Example 2, the 21-monoacetate is obtained.

$\Delta^4$-pregnene-7$\alpha$,17$\alpha$,21-triol-3,20-dione can be dehydrated as illustrated by the following example:

EXAMPLE 3

*$\Delta^{4,6}$-Pregnadiene-17$\alpha$,21-Diol-3,20-Dione*

A solution of 50 mg. of $\Delta^4$-pregnene-7$\alpha$,17$\alpha$,21-triol-3,20-dione in 2 ml. of 2.5% methanolic potassium hydroxide is allowed to stand at room temperature for 24 hours. During this period of time, the ultraviolet maximum at 241 m$\mu$ gradually decreases and gives way to a maximum at 285 m$\mu$ characteristic of the $\Delta^{4,6}$-3-ketone grouping. The solution is neutralized with dilute acetic acid, water is added and the methanol is evaporated in vacuo. The resulting suspension is extracted with chloroform, the chloroform removed in vacuo and the resulting residue crystallized from acetone-hexane to give pure $\Delta^{4,6}$-pregnadiene-17$\alpha$,21-diol-3,20-dione.

The invention may be variously otherwise embodied within the scope of the appended claims.

What is claimed is:

1. $\Delta^4$-pregnene-7$\alpha$,17$\alpha$,21-triol-3,20-dione.
2. $\Delta^4$ - pregnene - 7$\alpha$,17$\alpha$,21 - triol - 3,20 - dione 7$\alpha$,21-diacetate.
3. A compound selected from the group consisting of the 7$\alpha$-monoesters, 21-monoesters and 7$\alpha$,21-diesters of $\Delta^4$-pregnene-7$\alpha$,17$\alpha$,21-triol-3,20-dione, wherein the ester is derived from an organic hydrocarbon carboxylic acid of less than ten carbon atoms.

References Cited in the file of this patent

UNITED STATES PATENTS

| | | |
|---|---|---|
| 2,753,290 | Fried et al. | July 3, 1956 |
| 2,783,255 | Shull et al. | Feb. 26, 1957 |